April 19, 1949.  L. HORNBOSTEL  2,467,829
PAPER MACHINE CLUTCH DRIVE
Filed March 22, 1943  4 Sheets-Sheet 1

Inventor
LLOYD HORNBOSTEL.
Charles W. Hills
by  Attys.

April 19, 1949.  L. HORNBOSTEL  2,467,829
PAPER MACHINE CLUTCH DRIVE

Filed March 22, 1943  4 Sheets-Sheet 2

April 19, 1949. L. HORNBOSTEL 2,467,829
PAPER MACHINE CLUTCH DRIVE
Filed March 22, 1943 4 Sheets-Sheet 3

Inventor
LLOYD HORNBOSTEL.
Charles W. Hill
by Atty=.

April 19, 1949.　　　　L. HORNBOSTEL　　　　2,467,829
PAPER MACHINE CLUTCH DRIVE
Filed March 22, 1943　　　　　　　　　　4 Sheets-Sheet 4
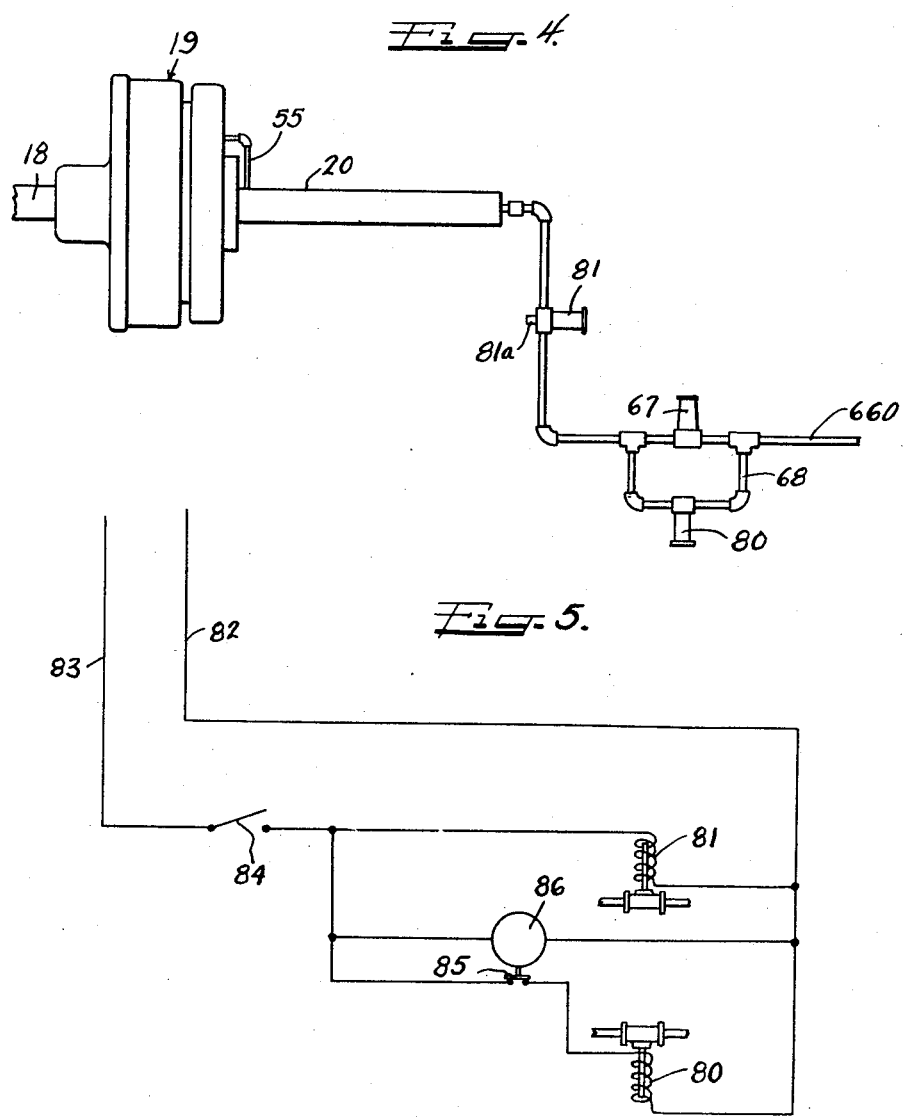

Patented Apr. 19, 1949

2,467,829

UNITED STATES PATENT OFFICE 2,467,829

PAPER MACHINE CLUTCH DRIVE

Lloyd Hornbostel, Beloit, Wis., assignor to Beloit Iron Works, Beloit, Wis., a corporation of Wisconsin Application March 22, 1943, Serial No. 480,053

7 Claims. (Cl. 192—87)

This invention relates to clutch drives for machines.

Specifically, the invention relates to fluid pressure-controlled clutch drives for starting sections of machines such as paper making machines, which sections are all driven by a single prime mover.

The invention will hereinafter be specifically described as embodied in a paper making machine, but it should be understood that the clutch drives of this invention are useful in other types of machines, especially machines having heavy driven sections which can only be brought up to operating speeds after the large inertia therein is overcome.

In accordance with this invention, the various sections of a Fourdrinier-type paper machine, or a cylinder-type paper making machine including the forming part, press sections, drier sections, and the like of such machines, are driven from a single prime mover such as a powerful electric motor or a steam turbine. A line shaft extending alongside of the paper making machine, and driven by the prime mover, has belt and cone pulley connections with right angle gear units at each section of the machine. These right angle gear units drive inshafts to the machine sections. A fluid pressure-operated clutch is provided in advance of each right angle gear unit so as to drive this unit. The clutch has a plurality of driving friction plates separated by shoes to be driven thereby for driving the right angle gear unit. The friction plates have splined connection with the driving side of the clutch. The shoes have splined connection with the driven side of the clutch. The clutch has a flexible diaphragm for acting on the shoes and friction plates to urge the same into tight engagement. This diaphragm is flexed by fluid under pressure. Compressed air is the preferred operating fluid.

The compressed air is preferably supplied to the diaphragm of each clutch from a single supply line through branch feed pipes which connect the supply line to each diaphragm. Each branch feed line has a pressure-reducing valve therein with a valved by-pass therearound. When the by-pass is closed, air is supplied to each clutch under reduced pressure and the clutches will provide a slip drive to each inshaft, thereby gently starting the various sections of the machine.

Automatic means are provided to open the by-pass around each pressure-reducing valve for subjecting each diaphragm to full air pressure when the sections of the machine reach a desired speed as compared with the driving speed. The slippage in the clutches is thus eliminated and the sections of the machine will be driven through a direct drive from the line shaft at speeds determined by the cone pulley and belt connections with the line shaft.

It is, then, an object of this invention to provide clutch drives for machines which prevent damage to the prime mover of the machine as well as the machine itself.

Another object of the invention is to provide an automatic safety starting device for machinery.

Another object of the invention is to provide fluid pressure-actuated clutch drives for machines adapted to automatically slip couple machine parts with a prime mover upon starting of the parts, and automatically directly couple the parts with the prime mover after the starting inertia of the parts has been overcome.

Another object of the invention is to provide fluid pressure-actuated clutch drives for paper making machines.

A specific object of the invention is to provide compressed air-actuated clutches between the inshaft and line shaft of a paper making machine for automatically starting the inshaft through a slip couple and then directly driving the inshaft when the same has reached a predetermined speed.

A further object of the invention is to provide a clutch having high thermal capacity.

A still further object of the invention is to provide clutch drives for paper making machines having a remote control, large thermal capacity, and variable starting torques.

A further object of the invention is to provide a fluid pressure control for fluid pressure-operated clutches which initially slip-couples the clutch parts and then directly couples the clutch parts.

A specific object of the invention is to provide an automatic fluid pressure control for fluid actuated clutches which initially slip-couples the clutch parts and, when the driven clutch parts reach a predetermined speed, automatically directly couples the clutch parts.

A still further object of the invention is to provide a fluid pressure-actuated clutch with an automatic fluid pressure control arrangement which initially slip-couples the clutch parts and then, after a predetermined period of time, directly couples the clutch parts.

Other and further objects of the invention will be apparent to those skilled in the art from the following detailed description of the annexed sheets of drawings which, by way of preferred examples, illustrate two embodiments of the invention.

On the drawings:

Figure 4 is a somewhat diagrammatic view of an alternative clutch drive according to this invention.

Figure 5 is a wiring diagram for the embodiment of the invention shown in Figure 4.

As shown on the drawings:

Figure 1:
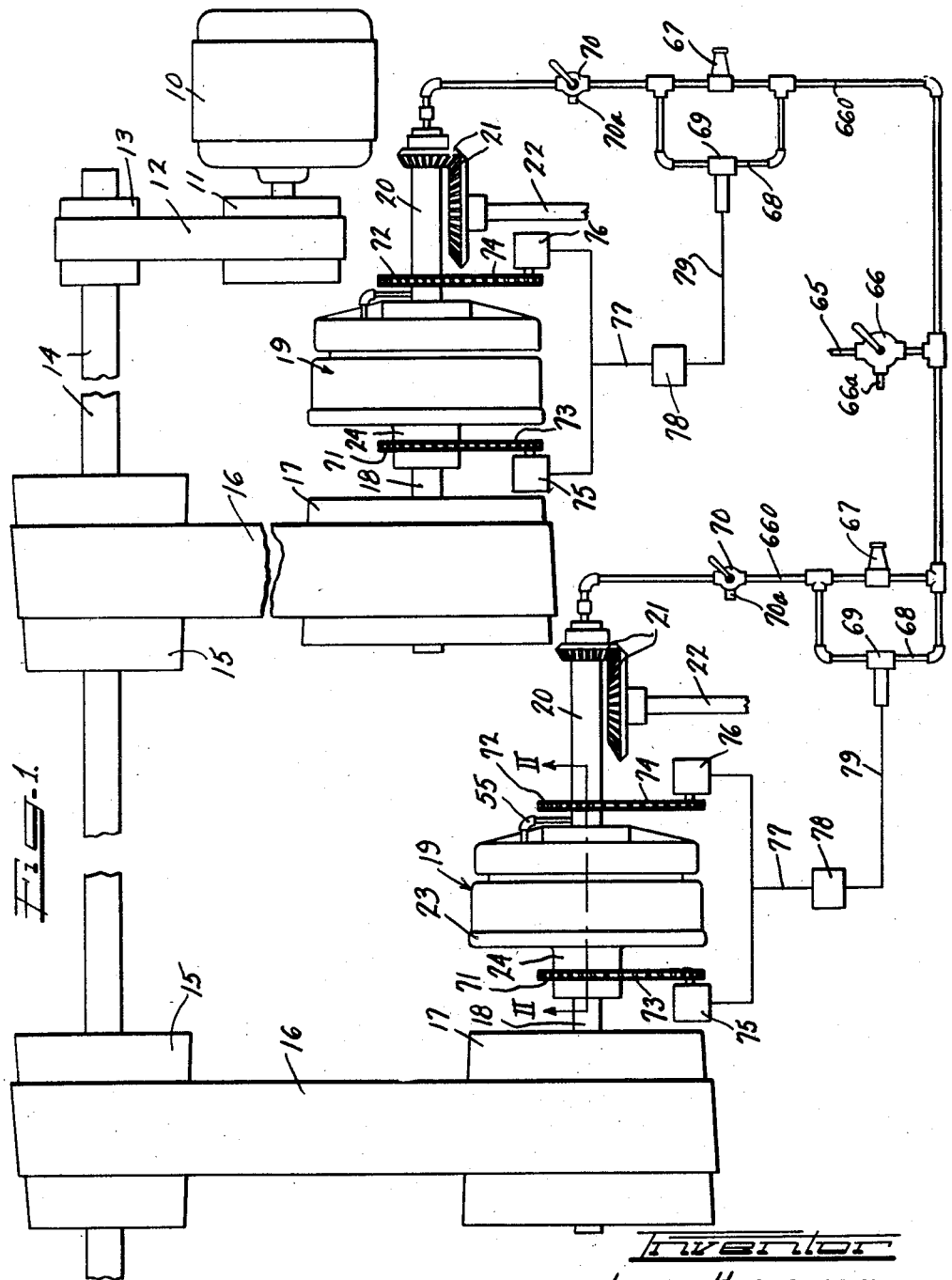
Figure 1 is a broken, fragmentary, somewhat diagrammatic plan view of a paper machine clutch drive according to this invention.

In Figure 1 the reference numeral 10 designates a prime mover such as an electric motor driving a pulley 11 with a belt 12 therearound. The belt 12 drives a pulley 13 on a line shaft 14. The line shaft has a plurality of cone pulleys 15 thereon. In a paper making machine the line shaft 14 extends along the full length of the machine and the pulleys 15 are positioned adjacent each section of the machine. Each pulley 15 drives a belt 16 which belt, in turn, drives a cone pulley 17 having a reversed taper with respect to the driving cone pulley 15. Lateral shifting of the belt 16 across the faces of the pulleys 15 and 17 will control the speed of the pulley 17.

Each pulley 17 drives a shaft 18 to a fluid pressure-operated clutch 19 of this invention. The clutch 19 has a shaft 20, which shaft 20 is connected, through a right angle gear unit including meshing bevel gears 21, to an inshaft 22. The inshafts 22 are coupled to the various sections of the paper machine (not shown) such as, for example, the drier section, the press section, and the like.

Figure 2:
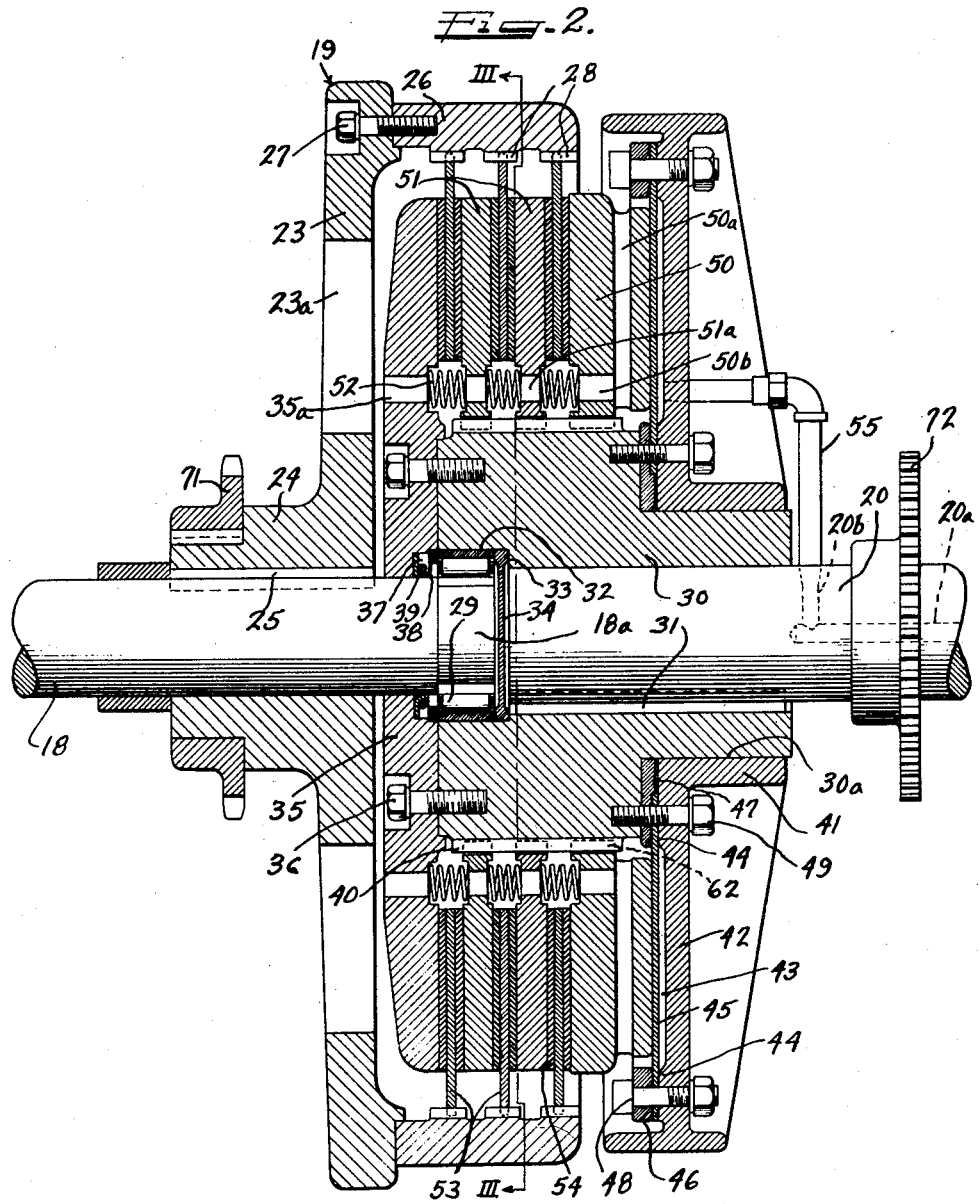
Figure 2 is an enlarged horizontal cross-sectional view, taken along the line II—II of Figure 1.
Figure 3:
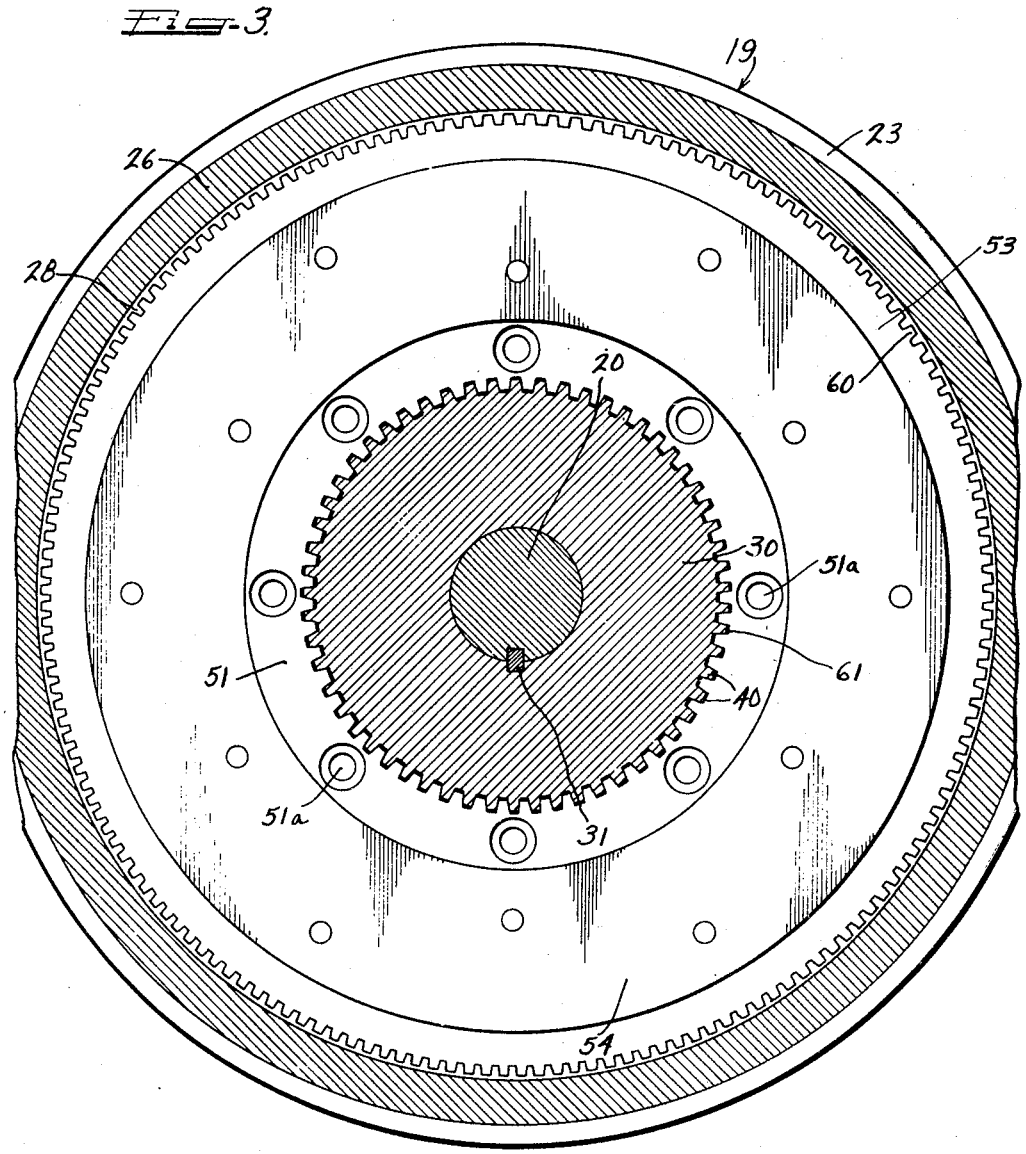
Figure 3 is a vertical cross-sectional view, taken along the line III—III of Figure 2.

As shown in Figures 2 and 3, each clutch 19 includes a spider or flange 23 with a hub 24 on the shaft 18 and connected for corotation with the shaft as by means of a key 25. The flange or spider 23 carries an annular band or ring 26 projecting laterally therefrom. The ring or band 26 can be secured to the flange or spider 23 as by means of bolts 27.

The interior of the band or ring 26 is splined or toothed as at 28.

The shaft 18 projects beyond the flange 23 and has a reduced diameter end portion 18a receiving the inner race ring of a roller bearing 29 therearound.

The shaft 20 projects into a hub member 30 and is keyed to this hub member as by means of a key 31.

The hub member 30 has an enlarged recess 32 therein beyond the end of the shaft 20 providing a shoulder 33. The outer race ring of the bearing 29 is seated in this recess 32 and a thrust disk 34 is bottomed on the shoulder 33 to receive the outer race ring of the bearing 29 thereagainst. As shown in Figure 2, this disk 34 has a thickened peripheral portion so that the disk will not rub against the inner race ring of the bearing 29.

An abutment plate 35 is bolted, as by means of bolts 36, to the end face of the hub member 30. This plate 35 receives the shaft 18 therethrough and has a recess 37 therein bottoming a thrust washer 38 engaging the other side of the outer race ring of the bearing 29. A bearing seal 39 is mounted in the recess 37. The shaft 18 preferably has a lubricant passage therein (not shown) for supplying lubricant to the bearing 29.

The hub member 30 is externally splined or toothed as at 40 but has a reduced-diameter portion 30a which is unsplined and receives therearound the hub 41 of a diaphragm plate member 42. The plate 42 has a recessed face portion 43 bounded by inner and outer concentric raised face portions 44.

A flexible diaphragm 45 overlies the relieved face portion 43 and is held against the raised face rings 44 in sealing relation therewith by means of a ring 46 covering the outer peripheral portion of the diaphragm, and an inner ring 47 covering the inner portion of the diaphragm. Bolts 48 extend through the ring 46, outer peripheral portion of the diaphragm 45, and plate 42 to secure the outer peripheral portion of the diaphragm to the plate in sealing relation with the raised ring portion 44 thereof. Bolts such as 49 extend through the plate 42, the inner marginal portion of the diaphragm 45, through the ring 47, and into the hub member 30 for holding the inner marginal portion of the diaphragm in sealing engagement with the inner ring face 44 and for securing the plate 42 to the hub 30.

A shoe 50 is slidably splined on the hub 30 and has a face portion for receiving the diaphragm 45 thereagainst.

Additional shoes 51 are likewise slidably splined onto the hub 30. Springs 52 are positioned between the shoes 51, between the shoe plate 35 and an adjacent shoe 51, and between the shoe 50 and adjacent shoe 51 for urging the shoes apart in a direction toward the diaphragm 45.

A plurality of metal disks 53 are slidably splined in the band or ring 26 and have friction material covers 54 on each face thereof adapted to frictionally engage the shoes 50 and 51 and the shoe plate 35.

The shaft 20 has an axial bore 20a therein together with a radial bore 20b intersecting the bore 20a adjacent the hub 30. A pipe connection 55 joins the bore 20b with the space between the diaphragm 45 and the relieved face 43 of the plate 42.

When fluid under pressure, such as compressed air, is supplied through the bores 20a and 20b and through the pipe connection 55 to the space between the diaphragm 45 and relieved face of the plate 42, the diaphragm will be flexed outwardly to slide the adjacent shoe 50 toward the adjacent friction covering on the first disk 53. The diaphragm force will overcome the force of the springs 52 and the shoe 50 will act through the disks 53 and shoes 51 for pressing the assembly together to couple tthe flange 23 with the hub 30 and thereby drive the shaft 20 from the shaft 18. The shoe plate 35, of course, is fixed on the hub 30 so that movement of the shoe 50 by the diaphragm 45 is effective to hold the shoes in frictional engagement with the coverings 54 on the disks 53.

When fluid pressure is relieved from the diaphragm-actuating space, the springs 52 are effective to slide the shoes 51 and 50 away from frictional engagement with the friction material 54 thereby breaking the drive connection between the shafts 18 and 20.

If the fluid pressure is such that the shoe 50 is not pressed with sufficient force to couple the shoes and shoe plates with the disks, a slip driving connection will be obtained. In accordance with this invention, such a slip-driving connection will be sufficient to start the sections of the machine at a gentle rate of acceleration from a high-speed prime mover without damaging any of the machine parts or the prime mover.

Since a friction slip couple between driving and driven parts will generate heat, the clutch of this invention is so designed as to have a large thermal capacity. The parts are arranged so that they will not be damaged when heated. In addition, an air cooling of the friction engaging parts is also provided. To this end the shoe 50 has radial ports 50a therethrough together with transverse ports 50b adjacent the keyed end thereof. These ports 50b communicate with the spring chambers and the spring chambers are connected through ports 51a with ports 35a in the shoe plate 35. The flange or spider 23 has large ports 23a therethrough. Air can freely flow through the passageways provided by the ports and, in addition, can flow around the shoe 50 and shoe plate 35. Dissipation of the heat of friction is thereby obtained in an efficient manner.

As best shown in Figure 3, each disk 53 is slidably splined to the teeth 28 of the drum, and each disk 53, therefore has splines or teeth 60 therearound. In addition, and as also shown in Figure 3, each shoe 51 is slidably splined on the splines 40 of the hub 30 and for this purpose is internally splined or toothed as at 61. The shoe 50 has similarly splined teeth 62, as shown in Figure 2, engaging the splined teeth 40.

As shown in Figure 1, compressed air can be supplied to the diaphragm chamber of each clutch 19 from a supply pipe 65 controlled by a valve 66. The air from the supply pipe 65 is fed to feed pipes 660 for each of the clutches 19. Each feed pipe 660 has a pressure-reducing valve 67 therein with a by-pass 68 therearound controlled by an electrically-operated valve 69. A manually operated valve 70 is also provided in each feed pipe 660 to selectively disengage a particular clutch 19 without disengaging the other clutches. The valve 70 is arranged so that it can be operated to stop air flow to the shaft 20 and at the same time relieve the air pressure behind the diaphragm by discharging the same through an outlet 70a in the valve. The main control valve 66 has a similar air outlet 66a for stopping all of the clutches.

The reducing valve 67 is set so that air passing therethrough will be at a low pressure sufficient only to slip-couple the shafts 18 and 20 and thereby gently start the inshafts 22. In order to automatically decrease the slip-couple and directly connect the inshaft 22 with the driving shaft 18, the by-pass 68 is provided and the valve 69 controlling flow therethrough is automatically opened whenever the speed of the driven shaft 20 increases to a predetermined speed. For this purpose the hub 24 of the clutch flange 23 has a sprocket 71 keyed thereon while the shaft 20 has a similar sprocket 72 keyed thereon. The sprocket 71 drives a chain 73 and the sprocket 72 drives a chain 74. The chains 73 and 74 respectively drive small generators 75 and 76.

Pilot generators 75 and 76 have been diagrammatically illustrated by line 77 as jointly effecting operation of a relay 78 which in turn effects closure of an energization circuit 79 to the electrically operated valve 69. Any conventional differential relay may be employed for this purpose which compares one voltage with another or one current with another, and which closes an electric circuit when a balance is obtained. By way of example and not by way of limitation, a relay of the type shown in the Winter Patent No. 1,653,078 may be employed, the circuit closing contacts of the Winter construction being connected in the energization circuit of the valve 69 hereof. Whenever the generator 76 is driven sufficiently fast from the driven shaft 20 as compared with the speed at which the generator 75 is driven from the drive shaft 18, the outputs of these generators approach each other and are substantially balanced. This causes the relay 78 to operate and close the energization circuit of the valve 69. Energization of this circuit, which is diagrammatically indicated at 79, opens the valve 69 thereby by-passing the reducing valve 67 and subjecting the diaphragm of the clutch to full air pressure of the supply pipe 65. As a result of this full or increased air pressure, the diaphragm 45 of each clutch will be further flexed to decrease the slip couple between the friction parts and frictionally couple these parts without slippage therebetween so that the shafts 18 and 20 will be frictionally connected for driving at the same speed.

In the arrangement of Figure 1, therefore, the prime mover 10 drives the driving parts of the clutches 19 at speeds determined by the cone pulley and belt connections with the main line shaft 14. The driven parts of the clutch are initially slip-coupled with the driving parts by air under pressure. The air pressure is held at a reduced rate by reducing valves 67 until the driven parts of the clutch are brought up to speed, whereupon the clutches will be subjected to full air pressure for changing the slip couple to a non-slipping, friction couple. As a result, the heavy inertia parts of the machine can be started without possible damage to the parts or to the prime mover. The clutches can be controlled from a remote point since the supply pipe 65 can extend to a control board remote from the machine and from the clutches. The manual valves 70 can be operated to selectively control each individual clutch. When it is desired to stop a particular section of the machine, the valve 70 controlling air flow to the clutch driving that particular section is actuated so as to relieve the air pressure from that particular clutch. When it is desired to stop all of the sections of the machine, the valve 66 is actuated to relieve air pressure from all of the clutches.

An alternative automatic control for the clutches 19 is illustrated in Figures 4 and 5. In Figure 4, parts identical with parts described in Figure 1 have been marked with the same reference numerals. As shown in Figure 4, the by-pass 68 around the pressure-reducing valve 67 has a solenoid-operated control valve 80 which, when energized, is in closed position as contrasted with the valve 69 of Figure 1, which is opened when energized.

A three-way solenoid-operated valve 81 is provided in the feed pipe 60 between the shaft 20 and the by-pass 68. When the valve 81 is energized, it is moved to a position for supplying air from either the by-pass 68 or the reducing valve 67 to the shaft 20 and clutch 19. When the valve 81 is deenergized, it will shut off air supply to the clutch 19 and will exhaust air from the clutch diaphragm through exhaust outlet 81a.

As shown in the wiring diagram of Figure 5, electric current is supplied to the solenoid valve 81 from power lines 82 and 83 whenever the switch 84 is closed. The solenoid valve 80 is also energized whenever the switch 84 is closed and a time switch 85 is also closed. This time switch 85 is controlled by a timer 86 which is energized whenever the switch 84 is closed. After the timer 86 has been energized for a predetermined period, it will open the time switch 85 to deenergize the valve 80 thereby opening the valve and permitting flow of air through the bypass 68 around the reducing valve 67.

The arrangement of Figures 4 and 5 therefore is such that the clutch 19 is originally subjected to air under pressure determined by the reducing valve 67 for slip-coupling the shaft 20 with the drive shaft 18. After a definite period of time from the initial starting of the clutch, the timer 86 will deenergize the valve 80 thereby opening the by-pass 68 and subjecting the clutch 19 to full air pressure for frictionally coupling the clutch parts without slippage therebetween. At the same time, the solenoid 81 is automatically moved to pass air through the pipe 66 to the clutch 19 whenever the main control switch 84 is closed. Whenever this switch 84 is opened, the valve 81 automatically vents the air pressure in the clutch through the outlet 81a and closes the pipe line 66a.

From the above descriptions it will be understood that this invention now provides safety clutch drives for machinery and especially suitable for paper making machines. The clutches of the invention are automatically actuated by air under pressure to initially slip-couple a machine part with its prime mover, and to then directly couple this machine part with its prime mover. In one arrangement the direct couple is automatically obtained after the part has reached a predetermined speed with relation to the driving speed. In another embodiment of the invention, the direct couple is effected after a definite period of time has elapsed from the initial slip-couple.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a safety drive adapted for driving the various sections of a paper making machine including a single prime mover, a main drive shaft driven by said prime mover, and a driven shaft for each of the various sections, a plurality of fluid pressure-operated clutches each having a plurality of friction disks driven by said main drive shaft, a plurality of shoes in each clutch connected to a driven shaft and adapted to frictionally engage said disks, a diaphragm for each clutch actuating the shoes into frictional engagement with the disks of the clutch, means for supplying air under controlled pressure to the diaphragm of each clutch for slip-coupling the shoes with the disks of the clutch, and means responsive to relative speeds of the main drive shaft and each driven shaft for increasing the air pressure supplied to each diaphragm to frictionally couple the shoes with the disks without slippage therebetween.

2. In a safety friction clutch drive adapted for driving the various sections of a paper making machine including a single prime mover, a main drive shaft driven by said prime mover, and a driven shaft for each of the various sections, a plurality of friction clutches each having friction disks driven by said main drive shaft, a plurality of disk-engaging shoes in each clutch connected to a driven shaft, a compressed air actuated diaphragm in each clutch acting on said shoes to frictionally couple the shoes with the disks, means for supplying compressed air at controlled pressures to said diaphragm for initially slip-coupling the shoes with the disks for driving the driven shaft from the drive shaft, and automatic means for increasing the air pressure on said diaphragm for frictionally coupling the shoes with said disks without slippage therebetween after completion of a predetermined slip-coupling period.

3. A clutch drive comprising a drive shaft, a driving clutch part driven by said drive shaft, a driven clutch part adapted to be driven by said driving clutch part, fluid pressure actuated means for coupling said driving and driven clutch parts, spring means for uncoupling said driving and driven clutch parts, means for supplying fluid under controlled pressure to said actuating means for slip-coupling the driving and driven clutch parts, a magneto driven by the driving clutch part, a second magneto driven by the driven clutch part, a frequency relay energized by said magnetos adapted to be actuated whenever the frequencies of current generated by said magnetos are substantially balanced, and an electric operated valve controlled by said relay to increase the fluid pressure on said actuating means for frictionally coupling the clutch parts without slippage therebetween whenever the speed of the driven part approaches the speed of the driving part.

4. A clutch comprising a first shaft, an internally splined clutch part secured on said first shaft, an externally splined clutch part rotatable on said first shaft, a second shaft secured to said second clutch part, alternately disposed friction disks and clutch shoes respectively slidably splined to said first and second clutch parts, spring means acting on said shoes to separate the shoes from the friction disks, a diaphragm carrying member secured on said second clutch part providing an air chamber, a diaphragm on said member covering said air chamber, means for supplying air under pressure to said chamber for flexing said diaphragm to thrust against said shoes and disks for slip-coupling the first and second clutch parts and means for automatically increasing the air pressure in said chamber to frictionally couple the clutch parts without slippage therebetween.

5. In a machine drive mechanism including a driving member, driven members and a plurality of fluid operated clutches providing a drive connection between each of said driven members and said drive member, means for supplying fluid under pressure in stages to said clutches comprising a fluid pressure supply pipe, feed pipes connecting each clutch with said supply pipe, a pressure reducing valve in each feed pipe for supplying said fluid under a predetermined pressure to actuate a clutch and establish a slip-driving connection therethrough between the corresponding driven member and the drive member, a by-pass around each pressure reducing valve, a valve controlling fluid flow through each by-pass, and mechanism operable after the aforesaid establishing of a slip-driving connection to open the corresponding by-pass valve to supply full fluid pressure to the clutch so actuated.

6. In a machine drive mechanism including a driving member, driven members and a plurality of fluid operated clutches providing a drive connection between each of said driven members and said drive member, means for supplying fluid under pressure in stages to said clutches comprising a fluid pressure supply pipe, feed pipe connecting each clutch with said supply pipe, a pressure reducing valve in each feed pipe for supplying said fluid under a predetermined pressure to actuate a clutch and establish a slip-driving connection therethrough between the corresponding driven member and the drive member, a by-pass around each pressure reducing valve, a valve controlling fluid flow through each by-pass, and mechanism including magnetos driven separately from said drive member and from said driven members and a relay in circuit with said magnetos and operable after the aforesaid establishing of a slip-driving connection to open the corresponding by-pass valve to supply full fluid pressure to the clutch so actuated.

7. A machine drive mechanism comprising a main drive shaft, a plurality of fluid pressure actuated clutches having driving and driven elements, means operatively connecting all of said driving elements to said main drive shaft, an inshaft driven by the driven element of each clutch, fluid pressure means operative under a given fluid pressure to actuate all of said clutches simultaneously to slip-couple said driving and driven elements to drive said inshafts from said drive shaft, and automatic means operative upon the completion of a predetermined slip-couple cycle to apply a higher fluid pressure to said clutches to increase the frictional pressure between said driving and driven elements and thereby reduce slippage therebetween.

LLOYD HORNBOSTEL.

REFERENCES CITED

The following references are of record in the file of this patent:

UNITED STATES PATENTS

| Number | Name | Date |
|---|---|---|
| 810,783 | Maxwell | Jan. 23, 1906 |
| 881,376 | Carpenter | Mar. 10, 1908 |
| 1,082,624 | Crouse et al. | Dec. 30, 1913 |
| 1,270,761 | Stein | June 25, 1918 |
| 1,368,434 | Higinbotham | Feb. 15, 1921 |
| 1,686,827 | Maag | Oct. 9, 1928 |
| 1,744,241 | Pierle | Jan. 21, 1930 |
| 1,759,755 | Lindner | May 20, 1930 |
| 1,999,366 | Maybach | Apr. 30, 1935 |
| 2,115,763 | Burke | May 3, 1938 |
| 2,214,201 | Moulder | Sept. 10, 1940 |
| 2,313,187 | Williamson | Mar. 9, 1943 |
| 2,370,360 | McLean et al. | Feb. 27, 1945 |

FOREIGN PATENTS

| Number | Country | Date |
|---|---|---|
| 327,386 | Germany | Oct. 11, 1920 |